(12) United States Patent
DeCovnick et al.

US011106898B2

(10) Patent No.: US 11,106,898 B2
(45) Date of Patent: Aug. 31, 2021

(54) LOSSY FACIAL EXPRESSION TRAINING DATA PIPELINE

(71) Applicant: Buglife, Inc., San Francisco, CA (US)

(72) Inventors: Daniel DeCovnick, San Francisco, CA (US); David Schukin, San Francisco, CA (US)

(73) Assignee: Buglife, Inc., San Francisco, CA (US)

( * ) Notice: Subject to any disclaimer, the term of this patent is extended or adjusted under 35 U.S.C. 154(b) by 119 days.

(21) Appl. No.: 16/358,518

(22) Filed: Mar. 19, 2019

(65) Prior Publication Data

US 2019/0286889 A1 Sep. 19, 2019

Related U.S. Application Data

(60) Provisional application No. 62/645,165, filed on Mar. 19, 2018.

(51) Int. Cl.
*G06K 9/00* (2006.01)
*G06K 9/62* (2006.01)

(52) U.S. Cl.
CPC ..... *G06K 9/00302* (2013.01); *G06K 9/00281* (2013.01); *G06K 9/6257* (2013.01); *G06K 9/6262* (2013.01)

(58) Field of Classification Search
CPC ............. G06K 9/00302; G06K 9/6262; G06K 9/00281; G06K 9/6257; G06K 9/6267; G06K 9/00201; G06K 9/00255
USPC ....................................................... 382/159
See application file for complete search history.

(56) References Cited

U.S. PATENT DOCUMENTS

| | | | |
|---|---|---|---|
| 8,824,808 B2* | 9/2014 | Brandt | G06T 5/005 382/201 |
| 2008/0170078 A1* | 7/2008 | Sullivan | G06K 9/00315 345/473 |
| 2011/0007174 A1* | 1/2011 | Bacivarov | G06K 9/00302 348/222.1 |
| 2014/0043329 A1* | 2/2014 | Wang | G06K 9/00201 345/420 |
| 2015/0286858 A1* | 10/2015 | Shaburov | G06T 7/337 382/103 |
| 2016/0148411 A1* | 5/2016 | Chen | G06T 5/006 345/420 |
| 2016/0275341 A1* | 9/2016 | Li | G06K 9/4642 |
| 2017/0286759 A1* | 10/2017 | Yao | G06K 9/00315 |
| 2019/0163965 A1* | 5/2019 | Yoo | G06K 9/629 |
| 2019/0251336 A1* | 8/2019 | Wu | G06K 9/3275 |
| 2020/0210688 A1* | 7/2020 | Xu | G06K 9/00281 |
| 2020/0302670 A1* | 9/2020 | Chen | G06K 9/00315 |

\* cited by examiner

*Primary Examiner* — Van D Huynh
(74) *Attorney, Agent, or Firm* — Cognition IP, P.C.; Edward Steakley

(57) ABSTRACT

Systems and methods allow a data labeler to identify an expression in an image of a labelee's face without being provided with the image. In one aspect, the image of the labelee's face is analyzed to identify facial landmarks. A labeler is selected from a database who has similar facial characteristics to the labelee. A geometric mesh is built of the labeler's face and the geometric mesh is deformed based on the facial landmarks identified from the image of the labelee. The labeler may identify the facial expression or emotion of the geometric mesh.

20 Claims, 5 Drawing Sheets

LOSSY FACIAL EXPRESSION TRAINING DATA PIPELINE

CROSS-REFERENCE TO RELATED APPLICATIONS

This application claims the benefit of U.S. Provisional Patent Application No. 62/645,165, filed Mar. 19, 2018, which is hereby incorporated by reference in its entirety.

FIELD OF THE INVENTION

The present invention relates to a method of enabling training of machine learning models for recognizing facial expressions using anonymized training data.

BACKGROUND

In some machine learning image recognition tasks, supervised training methods are employed. In some supervised training methods, a human labeler is used to identify certain characteristics in photographic images. Sometimes, the photographic images may contain recognizable people.

It would be desirable to have a method to allow the use of a human labeler while maintaining the anonymity of the people appearing in the photographic images. Moreover, it would be desirable for the method to also maintain or increase the accuracy over the non-anonymized supervised training methods.

SUMMARY OF THE INVENTION

One embodiment relates to a method for presenting an image to an operator that involves one or more electronic devices and more than one human electronic device operators. The electronic devices may capture image information of a scene, using one or more image capture sensors. A scene may include one or more persons, and have one or more classifiable characteristics. The electronic devices may have a video or image display that is capable of presenting an image taken by the image capture sensors or taken from a database. The electronic devices may also display instructions to operators. The electronic devices may also receive input from the user. The electronic devices may combine information from multiple sources to create a composite image that obfuscates an original image, while keeping desired characteristics of the original image. This may allow an operator to perform labeling tasks on images without knowing the true identity of the scene in the original image. This labeled data may then be used as training data for a variety of machine learning tasks.

DETAILED DESCRIPTION

Figure 1:
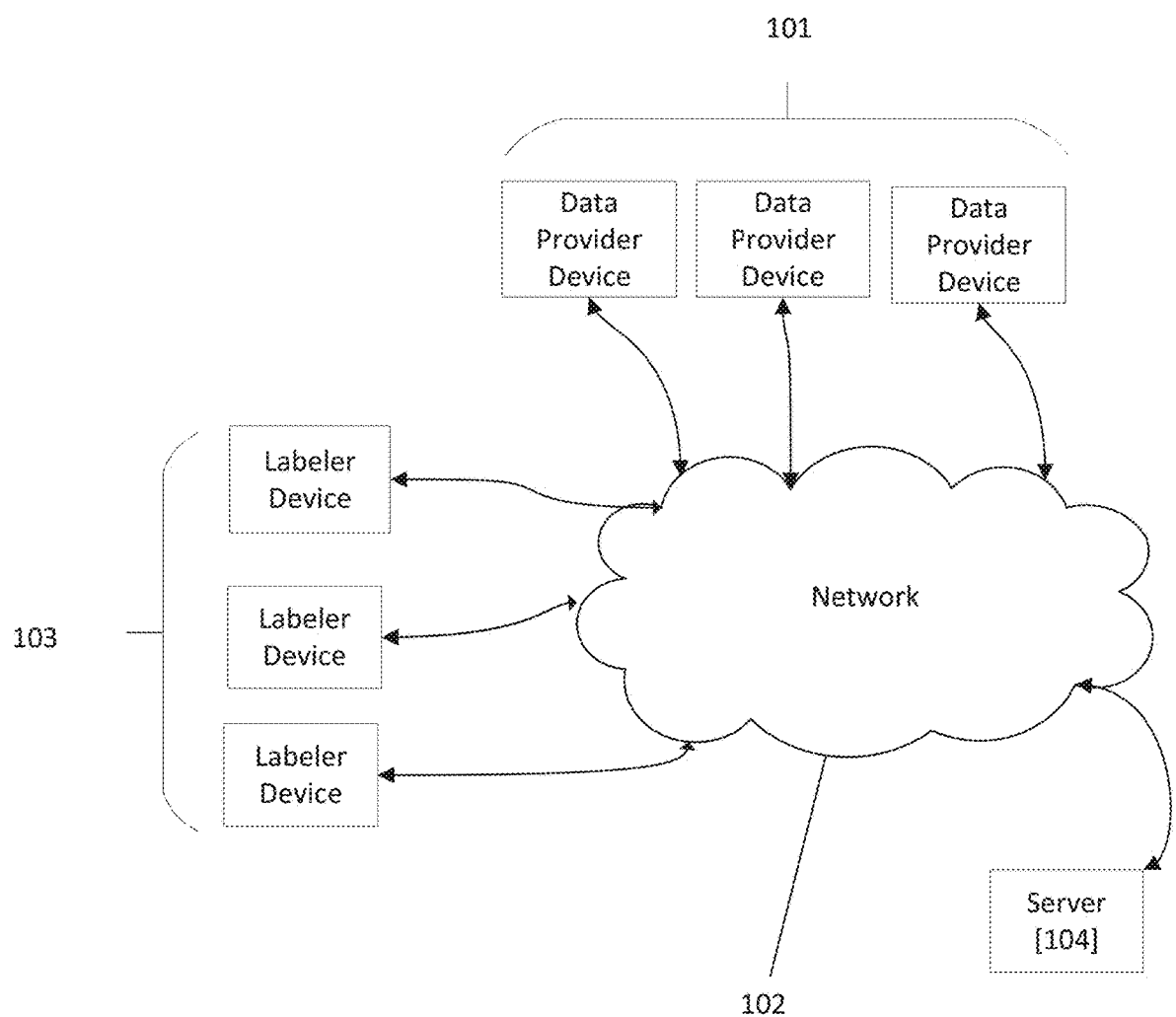
FIG. 1 illustrates an exemplary network environment in which methods and systems herein may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Embodiments of the invention may comprise one or more computers. Embodiments of the invention may comprise software and/or hardware. Some embodiments of the invention may be software only and may reside on hardware. A computer may be special-purpose or general purpose. A computer or computer system includes without limitation electronic devices performing computations on a processor or CPU, personal computers, desktop computers, laptop computers, mobile devices, cellular phones, smart phones, PDAs, pagers, multi-processor-based devices, microprocessor-based devices, programmable consumer electronics, cloud computers, tablets, minicomputers, mainframe computers, server computers, microcontroller-based devices, DSP-based devices, embedded computers, wearable computers, electronic glasses, computerized watches, and the like. A computer or computer system further includes distributed systems, which are systems of multiple computers (of any of the aforementioned kinds) that interact with each other, possibly over a network. Distributed systems may include clusters, grids, shared memory systems, message passing systems, and so forth. Thus, embodiments of the invention may be practiced in distributed environments involving local and remote computer systems. In a distributed system, aspects of the invention may reside on multiple computer systems.

Embodiments of the invention may comprise computer-readable media having computer-executable instructions or data stored thereon. A computer-readable media is physical media that can be accessed by a computer. It may be non-transitory. Examples of computer-readable media include, but are not limited to, RAM, ROM, hard disks, flash memory, DVDs, CDs, magnetic tape, and floppy disks.

Computer-executable instructions comprise, for example, instructions which cause a computer to perform a function or group of functions. Some instructions may include data. Computer executable instructions may be binaries, object code, intermediate format instructions such as assembly language, source code, byte code, scripts, and the like. Instructions may be stored in memory, where they may be accessed by a processor. A computer program is software that comprises multiple computer executable instructions.

A database is a collection of data and/or computer hardware used to store a collection of data. It includes databases, networks of databases, and other kinds of file storage, such as file systems. No particular kind of database must be used. The term database encompasses many kinds of databases such as hierarchical databases, relational databases, post-relational databases, object databases, graph databases, flat files, spreadsheets, tables, trees, and any other kind of database, collection of data, or storage for a collection of data.

A network comprises one or more data links that enable the transport of electronic data. Networks can connect computer systems. The term network includes local area network (LAN), wide area network (WAN), telephone networks, wireless networks, intranets, the Internet, and combinations of networks.

In this patent, the term "transmit" includes indirect as well as direct transmission. A computer X may transmit a message to computer Y through a network pathway including computer Z. Similarly, the term "send" includes indirect as well as direct sending. A computer X may send a message to computer Y through a network pathway including computer Z. Furthermore, the term "receive" includes receiving indirectly (e.g., through another party) as well as directly. A computer X may receive a message from computer Y through a network pathway including computer Z.

Similarly, the terms "connected to" and "coupled to" include indirect connection and indirect coupling in addition to direct connection and direct coupling. These terms include connection or coupling through a network pathway where the network pathway includes multiple elements.

To perform an action "based on" certain data or to make a decision "based on" certain data does not preclude that the action or decision may also be based on additional data as well. For example, a computer performs an action or makes a decision "based on" X, when the computer takes into account X in its action or decision, but the action or decision can also be based on Y.

In this patent, "computer program" means one or more computer programs. A person having ordinary skill in the art would recognize that single programs could be rewritten as multiple computer programs. Also, in this patent, "computer programs" should be interpreted to also include a single computer program. A person having ordinary skill in the art would recognize that multiple computer programs could be rewritten as a single computer program.

The term computer includes one or more computers. The term computer system includes one or more computer systems. The term computer server includes one or more computer servers. The term computer-readable medium includes one or more computer-readable media. The term database includes one or more databases.

One embodiment of the invention relates to enabling training of machine learning models for facial expressions without providing a picture of the face of the person being labeled (labelee) to the labeler person while still allowing the labeler to recognize an emotion. Not providing a picture of the face of the person being labeled may be advantageous to maintain privacy. One embodiment relates to taking a photo of a labelee person with RGB and/or infrared cameras and analyzing the measurements and locations of facial landmarks. The system may then search a database to identify a labeler with similar measurements and locations of facial landmarks. The labeler and labelee may be operating separate electronic devices that are connected by a network. Once the labeler is identified, the task of labeling the labelee's expression may be assigned to the labeler. Geometric mesh of the labeler's face may be generated, with the labeler's own face textured on to the mesh. The facial landmarks of the mesh may be manipulated to match the measurements of the labelee. The labeler may then be prompted to classify the expression or emotion visible on the mesh, which looks like the labeler's face. Options may be presented through user interface elements, such as happy, sad, angry, worried, frustrated, and so on. The label may be received from the labeler through one or more user interface elements, and the label may be attached to the photo of the labelee.

In addition to being used for creation of machine learning training data, the methods and systems herein may also be used at runtime. For example, it may allow a human labeler to label an expression of an individual without ever seeing a photo of the face of the individual. The identification of the expression may be used for a variety of purposes such as unlocking a device, sentiment analysis, and other tasks.

FIG. 1 illustrates an exemplary network environment 100 in which the methods and systems herein may operate. Data Provider Devices 101 may be used by an operator in order to produce data for a supervised learning system. Data Provider Devices 101 may collect image data such as a picture of an operator's face. Data Provider Devices 101 may be any electronic device with one or more camera sensors. The Data Provider Devices 101 may be connected to network 102. The network 102 may be, for example, a local network, intranet, wide-area network, Internet, wireless network, wired network, Wi-Fi, Bluetooth, or other networks. Labeler Devices 103 connected to the network 102 may be used by an operator to label image data. Labeler Devices 103 may collect image data such as a picture of an operator's face. Labeler Devices 103 may be any electronic device with one or more camera sensors. Labeler Devices 103 may also have a way of displaying electronic images to the operator, for example, an LCD screen or monitor. Labeler Devices 103 may also have an input mechanism, such as a touchscreen, computer mouse, computer keyboard, and so on, that allows the operator to perform labeling actions. Server 104 may be a computer system that stores data collected from various Labeler Devices 103 and Data Provider Devices 101, and may also coordinate communications between devices on network 102. Server 104 may also host one or more services such as a database, web server, application server, and so on.

In some embodiments, each Data Provider Device in Data Provider Devices 101 may be one or multiple devices, each with multiple sensors, each collecting different image data of the operator. The multiple devices may be connected to the network 102. In some embodiments each Labeler Device in Labeler Devices 103 may be one or multiple devices, each with multiple sensors, each collecting different image data of the operator. The multiple devices may be connected to network 102. When multiple devices with multiple sensors are used, the image data collected may be combined to form a representation of an operator from multiple angles, times, wavelengths, axes, and so on.

Figure 2A:
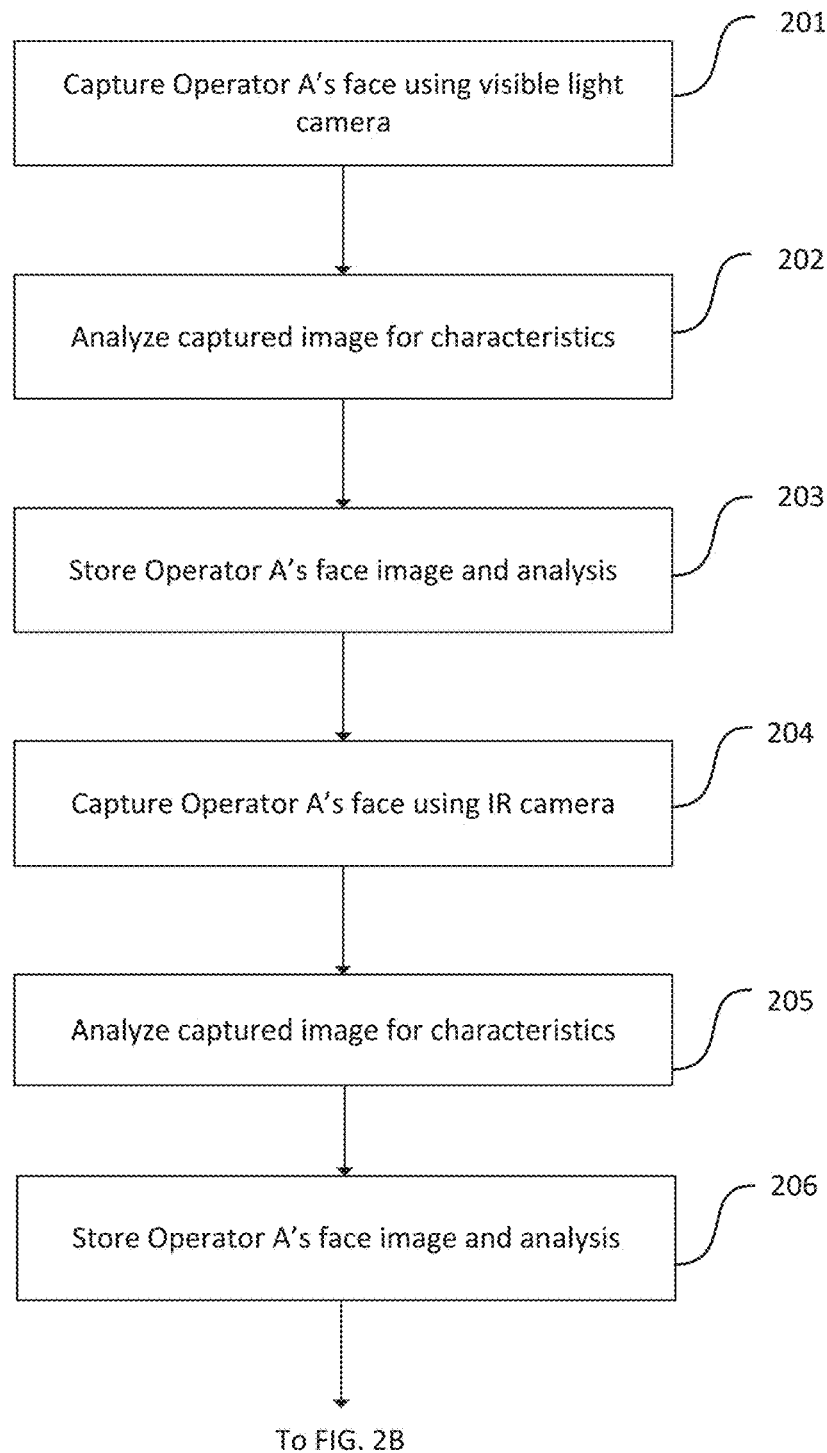
FIGS. 2A-C illustrates an exemplary method that may be performed in some embodiments.
Figure 2B:
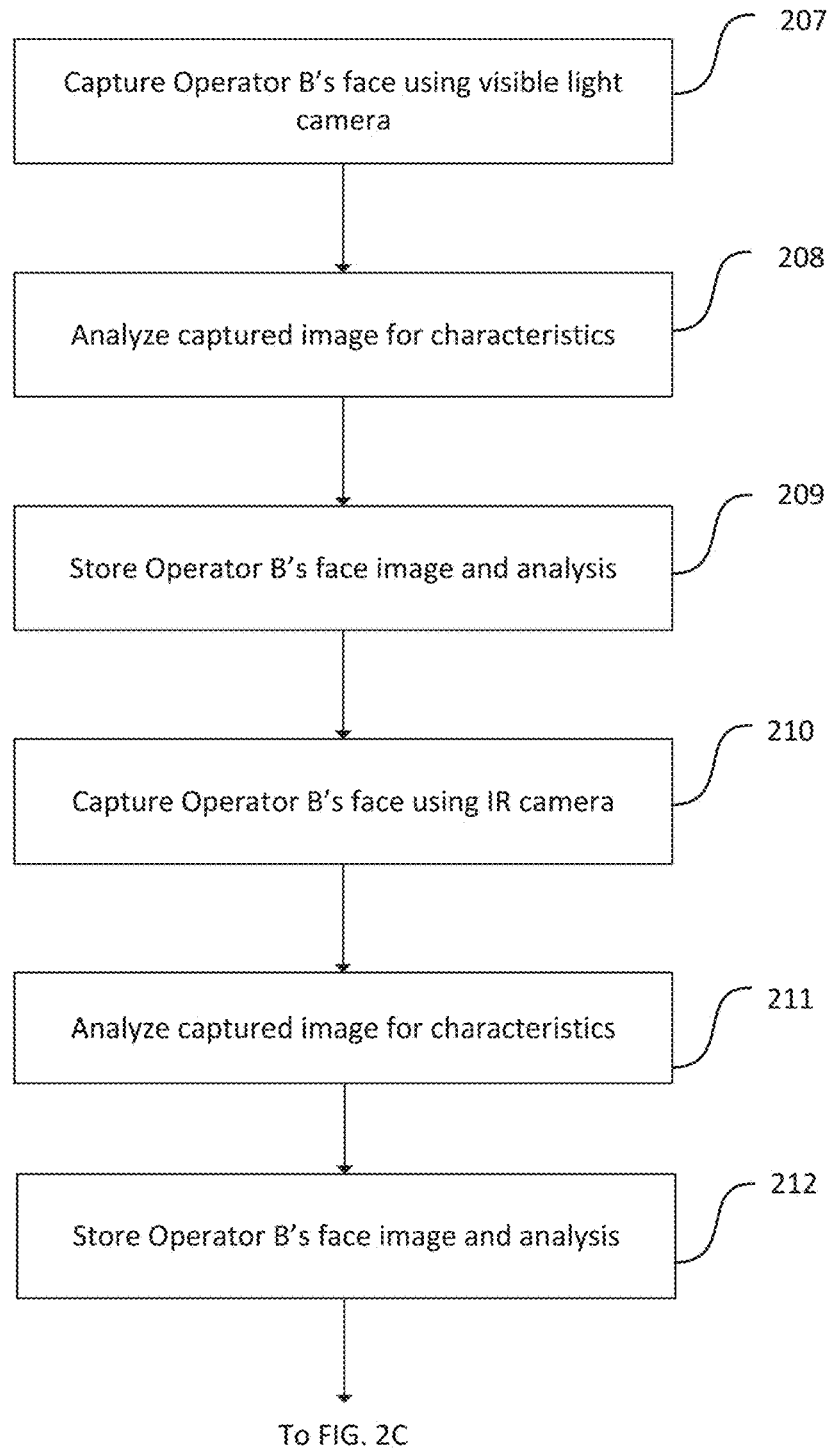
Figure 2C:
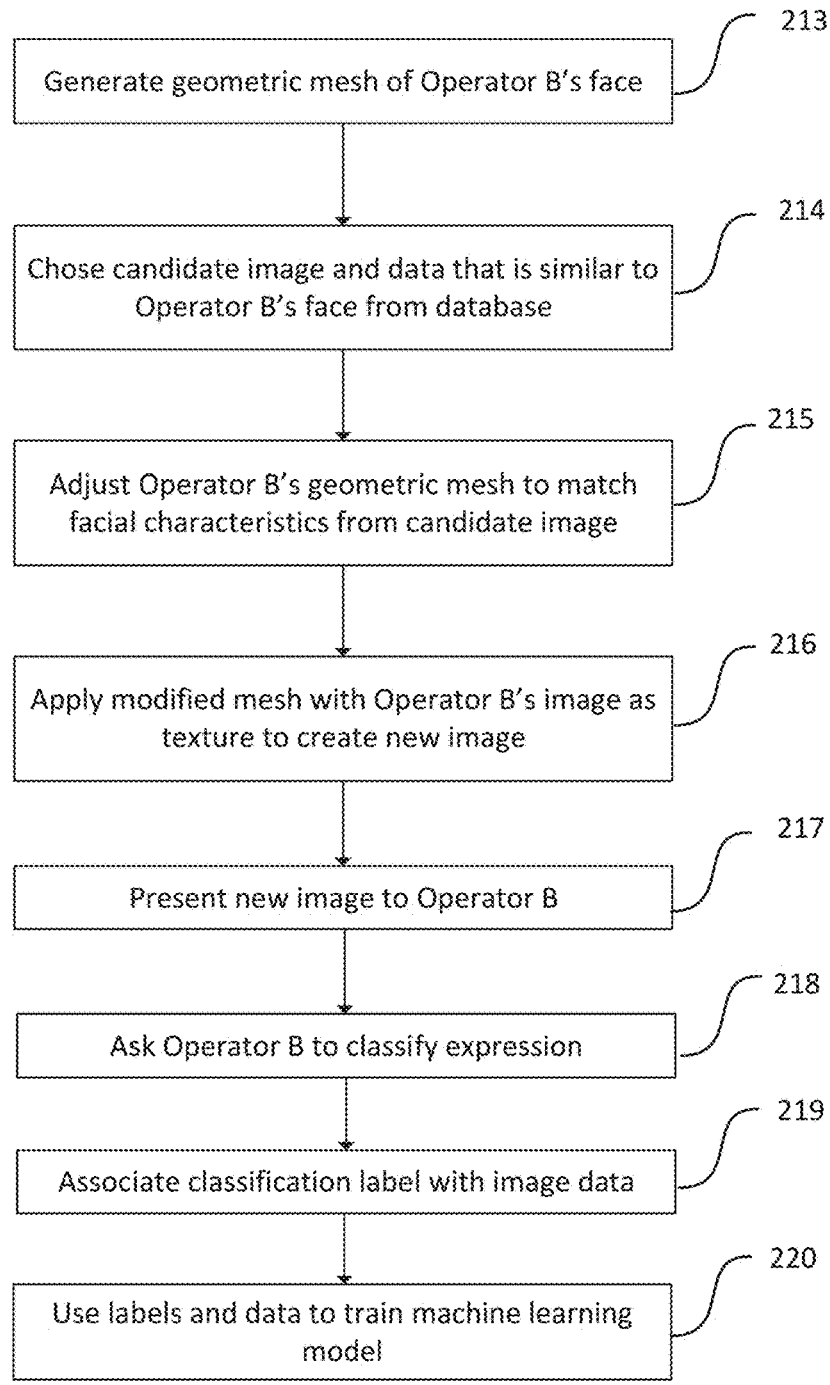

FIG. 2 is a flow chart illustrating an exemplary method 200 that may be performed in some embodiments by a computer system. In step 201, an image of an operator A's face is captured by a Data Provider Device via a visible light camera sensor. In step 202, the image of step 201 is analyzed for facial characteristics, including, but not limited to, overall dimensions of the face, such as height and width, and facial landmarks such as eyes, eyebrows, nose, nares, mouth, lips, ears, hairline, and so on. In step 203, the results of the analysis completed in step 202 are recorded in memory. In step 204, an image of an operator A's face is captured by a Data Provider Device via an infrared light camera sensor and may include depth data. In step 205, the infrared image of step 204 is analyzed for facial characteristics, including, but not limited to, overall dimensions of the face, such as height and width, and facial landmarks and their depths, such as eyes, eyebrows, nose, nares, mouth, lips, ears, hairline, and so on. In step 206, the results of the analysis completed in step 205 are recorded in a database. Steps 201-203 may occur before, after, or simultaneously with steps 204-206. Steps 201-206 operator A may reference one or more operators, and may be repeated one or more times. In step 207, an image of an operator B's face is captured by a Labeler Device via a visible light camera sensor. In step 208, the visible light image of step 207 is analyzed for facial characteristics, including, but not limited to, overall dimensions of the face, such as height and width, and facial landmarks, such as eyes, eyebrows, nose, nares, mouth, lips, ears, hairline, freckles, and so on. In step 209, the results of the analysis completed in step 208 are recorded in memory. In step 210, an image of an operator B's face is captured by a Labeler Device via an infrared light camera sensor and may include depth data. In step 211, the infrared image of step 210 is analyzed for facial characteristics, including, but not limited to, overall dimensions of the face, such as height and width, and facial landmarks and their depths, such as eyes, eyebrows, nose, nares, mouth, lips, ears, hairline, freckles, and so on. In step 212, the results of the analysis completed in step 211 are recorded in memory. Steps 207-209 may occur before, after or simultaneously with steps 210-212. In step 213, a geometric mesh of the operator B's face in the images captured in steps 207 and 210 is generated. A geometric mesh is a representation that may comprise vertices, edges, and faces found in the image, and represents a 3D geometry of a face. In step 214, a candidate operator's image and data is chosen from the database from step 206 that most closely matches the images captured in steps 207 and 210 as recorded in steps 209 and 212, respectively. In step 215, operator B's mesh is modified to match the facial characteristics of the candidate operator. In step 216, a new image is presented to the operator that comprises the image captured in step 207, as a texture to the modified mesh created in step 215, where the facial landmarks represented by the mesh are manipulated to match the measurements analyzed in step 205 of the candidate image chosen in step 214. In step 217, the new image is presented to operator B. In step 218, operator B is asked to classify the expression, emotion, or other characteristic of the image presented in step 215. In step 219, operator B's label from step 216 is associated with the image data collected in steps 201 and 204. Steps 207-219 operator B may reference one or more operators, and may be repeated one or more times. In step 220, the images and assigned labels from step 217 may be used to train a machine learning model. Steps 201-206, steps 207-219, and step 220 may occur asynchronously.

The type of machine learning model that uses the training data described in these embodiments may comprise one or more statistical models, artificial neural networks (ANN), deep neural networks (DNN), convolutional neural networks (CNN), and others.

Figure 3:
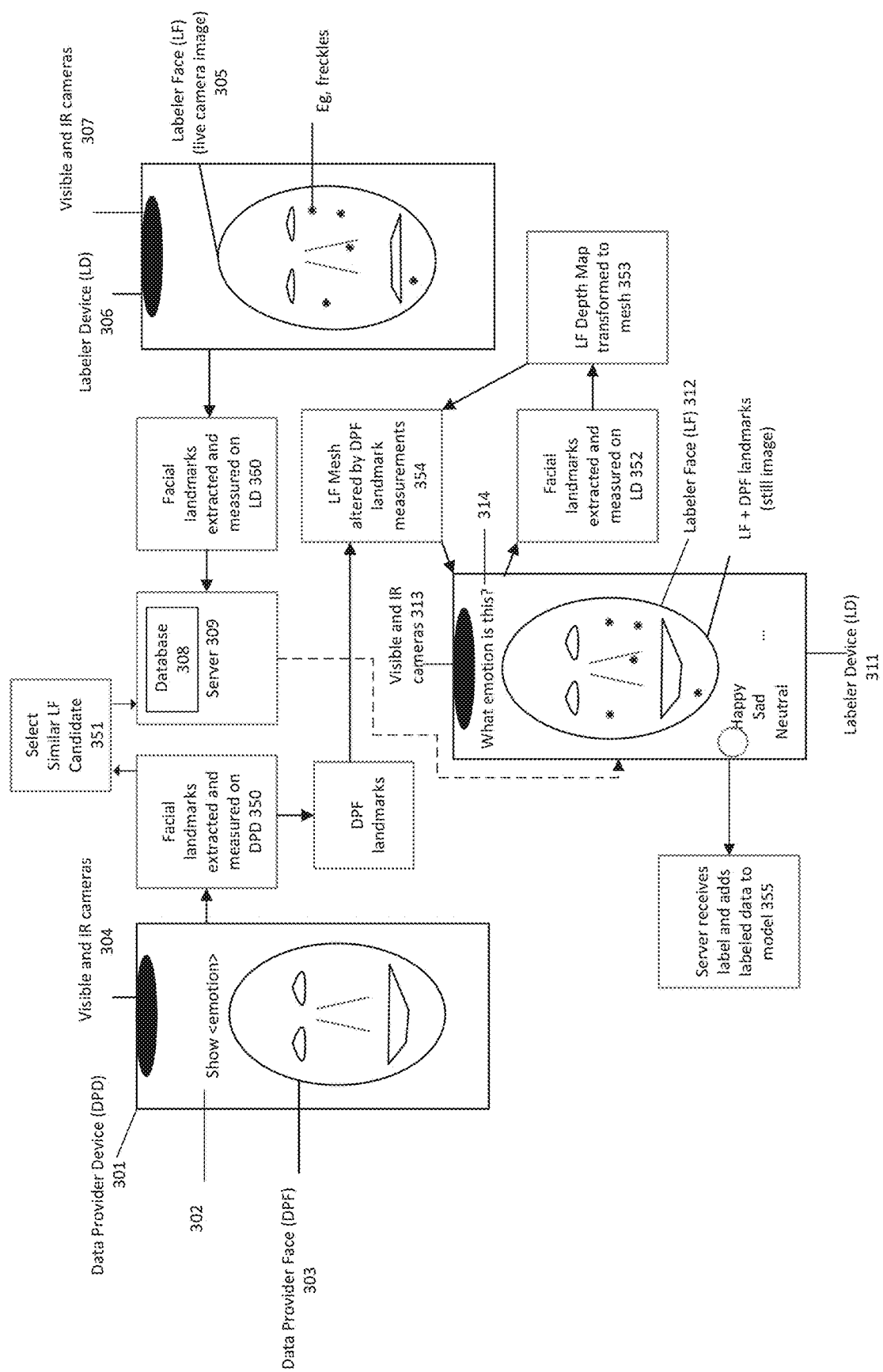
FIG. 3 is a flow chart illustrating an exemplary method and interface that may be performed in some embodiments by a computer system.

FIG. 3 illustrates an exemplary interface and method that may be performed for some embodiments. Data Provider Device 301 may be an electronic device that has one or more image capture sensors and a video or image display component such as an LCD panel. Instruction 302 may appear on the screen instructing an operator to show a specific emotion or sets of emotions, for example, happy, sad, angry, worried, frustrated, and so on. Data Provider Face 303 is captured on Data Provider Device 301 using a variety of sensors including visible and IR camera sensors 304. In step 350, facial landmarks are extracted and measured from the images captured by visible and IR camera sensors 304. Asynchronously to step 350, Labeler Face 305 is captured on Labeler Device 306 using a variety of sensors including visible and IR camera sensors 307. In step 360, after the capture of Labeler Face 305, the facial landmarks extracted are sent to server 309 and stored in database 308. Step 360 may occur one or more times with one or more Labeler Face 305 captures. In step 351, following step 350, a candidate human labeler with similar facial landmarks as Data Provider Face 303 is selected from database 308 on server 309. Facial landmarks for human labelers are obtained through one or more iterations of step 360 on one or more human labelers. Server 309 initiates a connection to Labeler Device 311 operated by the candidate human labeler identified in step 351. In step 352, Labeler Face 312 is captured on Labeler Device 311 using a variety of sensors including visible and IR camera sensors 313 to produce a depth map. In step 353, Labeler Face 312's depth map is transformed into a mesh. In step 354, the mesh is altered to match the DPF landmarks extracted in step 350 and the mesh is applied to Labeler Face 312. This process applies the expression of Data Provider Face 303 to Labeler Face 312 to produce a modified Labeler Face 312. Instruction 314 may appear on the Labeler Device 311 prompting the operator to identify the emotion displayed by the modified Labeler Face 312. The operator may select the emotion he/she thinks matches the displayed modified Labeler Face 312 via an input mechanism such as a touch screen, electronic keyboard, electronic mouse, and so on. In step 355, a server receives the labeled data and adds the labeled data to the training model. Any communication between devices, servers, and databases may occur through a network such as a local network, intranet, wide-area network, Internet, wireless network, wired network, Wi-Fi, Bluetooth, or other networks The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

The invention claimed is:

1. A method for labeling training data for a machine learning algorithm comprising:
   capturing, on a first electronic device, an image of a first face of a labelee;
   analyzing the first face to identify first landmarks of first features of the first face and storing the first landmarks in a database;

capturing, on a plurality of second electronic devices, images of faces of labelers;

analyzing the images of faces of labelers to identify second landmarks and storing the second landmarks in the database;

selecting a labeler having facial features similar to the first face based on the stored first landmarks and second landmarks;

generating a three-dimensional mesh of a face of the selected labeler, the three-dimensional mesh textured with an image of the selected labeler;

identifying third landmarks of the three-dimensional mesh that correspond to the first landmarks;

manipulating positions of the third landmarks based on positions of the first landmarks;

displaying the three-dimensional mesh to the selected labeler;

prompting the selected labeler to input an expression or emotion displayed on the three-dimensional mesh;

associating the input expression or emotion with the image of the first face to generate training data for a machine learning model for expression or emotion identification.

2. The method of claim 1, wherein the first electronic device comprises a mobile phone.

3. The method of claim 1, wherein the image of the first face comprises an Red Green Blue (RGB) image.

4. The method of claim 1, wherein the image of the first face comprises an infrared image.

5. The method of claim 1, wherein the machine learning model comprises a convolutional neural network.

6. The method of claim 1, wherein the first landmarks comprise features pixel-level features of the eyes, eyebrows, nose, nares, mouth, lips, ears, hairline, or freckles.

7. The method of claim 1, wherein the input expression or emotion comprises one or more of happiness, sadness, anger, or frustration.

8. The method of claim 1, wherein the first electronic device and second electronic devices are connected over a network.

9. The method of claim 1, wherein the second electronic devices include a touch screen.

10. The method of claim 1, further comprising prompting, by the first electronic device, the labelee to show an expression or emotion prior to the capture of the image of the first face.

11. A non-transitory computer-readable medium comprising instructions for labeling training data for a machine learning algorithm, the non-transitory computer-readable medium comprising instructions for:

capturing, on a first electronic device, an image of a first face of a labelee;

analyzing the first face to identify first landmarks of first features of the first face and storing the first landmarks in a database;

capturing, on a plurality of second electronic devices, images of faces of labelers;

analyzing the images of faces of labelers to identify second landmarks and storing the second landmarks in the database;

selecting a labeler having facial features similar to the first face based on the stored first landmarks and second landmarks;

generating a three-dimensional mesh of a face of the selected labeler, the three-dimensional mesh textured with an image of the selected labeler;

identifying third landmarks of the three-dimensional mesh that correspond to the first landmarks;

manipulating positions of the third landmarks based on positions of the first landmarks;

displaying the three-dimensional mesh to the selected labeler;

prompting the selected labeler to input an expression or emotion displayed on the three-dimensional mesh;

associating the input expression or emotion with the image of the first face to generate training data for a machine learning model for expression or emotion identification.

12. The non-transitory computer-readable medium of claim 11, wherein the first electronic device comprises a mobile phone.

13. The non-transitory computer-readable medium of claim 11, wherein the image of the first face comprises an Red Green Blue (RGB) image.

14. The non-transitory computer-readable medium of claim 11, wherein the image of the first face comprises an infrared image.

15. The non-transitory computer-readable medium of claim 11, wherein the machine learning model comprises a convolutional neural network.

16. The non-transitory computer-readable medium of claim 11, wherein the first landmarks comprise features pixel-level features of the eyes, eyebrows, nose, nares, mouth, lips, ears, hairline, or freckles.

17. The non-transitory computer-readable medium of claim 11, wherein the input expression or emotion comprises one or more of happiness, sadness, anger, or frustration.

18. The non-transitory computer-readable medium of claim 11, wherein the first electronic device and second electronic devices are connected over a network.

19. The non-transitory computer-readable medium of claim 11, wherein the second electronic devices include a touch screen.

20. The non-transitory computer-readable medium of claim 11, further comprising instructions for prompting, by the first electronic device, the labelee to show an expression or emotion prior to the capture of the image of the first face.

* * * * *